United States Patent
Stabile, Jr.

(10) Patent No.: US 7,540,555 B2
(45) Date of Patent: Jun. 2, 2009

(54) MOBILE TRUCK TENT OF ADJUSTABLE HEIGHT

(76) Inventor: Albert A. Stabile, Jr., 19838 Archwood St., Winnetka, CA (US) 91306

(*) Notice: Subject to any disclaimer, the term of this patent is extended or adjusted under 35 U.S.C. 154(b) by 162 days.

(21) Appl. No.: 11/590,521

(22) Filed: Oct. 31, 2006

(65) Prior Publication Data

US 2007/0108800 A1 May 17, 2007

Related U.S. Application Data

(63) Continuation-in-part of application No. 10/830,227, filed on Apr. 22, 2004, now Pat. No. 7,128,364.

(60) Provisional application No. 60/464,202, filed on Apr. 22, 2003.

(51) Int. Cl.
*B60P 3/377* (2006.01)

(52) U.S. Cl. .............. 296/159; 296/160; 296/169; 135/88.15

(58) Field of Classification Search .......... 296/159, 296/160, 164, 169, 170, 174, 63, 64, 26.01, 296/26.12, 26.02, 26.04; 135/88.13–88.17
See application file for complete search history.

(56) References Cited

U.S. PATENT DOCUMENTS

| | | | |
|---|---|---|---|
| 2,846,262 A * | 8/1958 | Ray | 296/161 |
| 3,009,212 A * | 11/1961 | Makens | 52/66 |
| 4,938,523 A | 7/1990 | Camp | |
| 5,299,849 A | 4/1994 | Cook et al. | |
| 5,353,826 A | 10/1994 | Davis, Sr. | |
| 5,419,607 A * | 5/1995 | Oliveira | 296/159 |
| 5,423,587 A | 6/1995 | Ingram | |
| 5,462,330 A | 10/1995 | Brown | |
| 5,556,156 A * | 9/1996 | Kirk | 296/100.15 |
| 5,692,795 A | 12/1997 | Mininger | |
| 5,752,736 A | 5/1998 | Nodier | |
| 5,954,076 A | 9/1999 | McGinnis | |
| 5,988,195 A | 11/1999 | Kaestner et al. | |
| 5,988,731 A | 11/1999 | Eischen | |
| 6,170,502 B1 | 1/2001 | Pullen | |
| 6,209,944 B1 | 4/2001 | Billiu et al. | |
| 6,257,260 B1 | 7/2001 | Phillips | |
| 6,481,784 B2 | 11/2002 | Cargill | |
| 6,616,212 B1 | 9/2003 | Bishop | |
| 7,021,694 B1 * | 4/2006 | Roberts et al. | 296/100.18 |
| 2002/0109374 A1 | 8/2002 | Cargill | |

* cited by examiner

*Primary Examiner*—Glenn Dayoan
*Assistant Examiner*—Gregory Blankenship
(74) *Attorney, Agent, or Firm*—Pillsbury Winthrop Shaw Pittman LLP

(57) ABSTRACT

A portable, highway legal truck tent made of steel tubing, having a durable cover, and containing two built-in bench seats is disclosed. The truck tent assembles within thirty minutes and once on a truck, it requires no disassembly/reassembly. Because of its durability, the cover will not flutter when driving at fast speeds. The construction/design of the metal tubing frame allows campers to drive to their destinations with the tent already assembled. The mobile tent can remain on the truck bed or be placed on the ground. The frame has poles that extend into the truck bed and lock on the truck tie downs, which are in the form of clamps that hook under the lip of the truck bed. Interlocking pins in the frame of the bench seat allow for enlargement of the bench seat to adjust to varying lengths and widths of different trucks.

14 Claims, 13 Drawing Sheets

MOBILE TRUCK TENT OF ADJUSTABLE HEIGHT

RELATED APPLICATIONS

This application claims the benefit of priority under 35 U.S.C. § 120 as a continuation-in-part of U.S. patent application Ser. No. 10/830,227, filed Apr. 22, 2004, now U.S. Pat. No. 7,128,364, issued Oct. 31, 2006, entitled "Mobile Truck Tent," the contents of which are hereby incorporated by reference in their entirety. U.S. patent application Ser. No. 10/830,227 (now U.S. Pat. No. 7,128,364) claims the benefit of priority under 35 U.S.C. § 119 of provisional U.S. patent application Ser. No. 60/464,202, filed Apr. 22, 2003, entitled "Mobile Truck Tent," the contents of which are hereby incorporated by reference in their entirety as if fully set forth.

BACKGROUND

1. Technical Field

Embodiments described herein are directed to a mobile truck tent. Specifically, the frame of the mobile truck tent is made of steel tubing, is freeway-safe, contains two built-in bench seats made of metal, and requires little or no assembly/disassembly/reassembly for its various uses. In addition, the cover for the mobile truck tent is durable and will not flutter when driven at high speeds.

2. Related Art

The use of truck tent covers of various types is well known in the art. For example, cover assemblies that attach to the tops of the sidewalls of pickup truck beds have been previously disclosed. Assemblies having base portions that rest on the bottom of pickup truck beds have also been taught. The assemblies may be of the collapsible rigid enclosure as well as of the soft enclosure variety. Such truck tent covers typically are limited in combination with a truck bed alone, provide little versatility, and lack strength in construction or are expensive, difficult to install on and remove from a pickup truck bed, and do not provide sufficient coverage from the elements. The mobile truck tent as taught herein substantially departs from the conventional concepts and designs known in the art, and in doing so, provides an apparatus for protecting cargo within a truck bed as well as for providing shelter for individuals while camping or performing numerous other activities. The mobile truck tent sustains normal freeway speeds; provides adequate shelter from rain, wind, and other harsh weather conditions; requires no disassembly; and contains two twenty-inch wide bench seats.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs and figures describe a new and improved mobile truck tent that may be attached to bed sidewalls of a pickup truck 100 or anchored to the ground for camping or other activities and purposes. Because of the design of its support frame, the mobile truck tent has the advantage of remaining assembled on the back of the pickup truck 100 at all times—even while driving. The mobile truck tent has a plethora of uses and applications. It can easily be used for hauling materials such as refuse and recyclables. Nurseries can employ the truck tent for hauling soil, seeds, plants, trees, and gardening tools. The mobile truck tent may be used by any delivery company for groceries, packages, etc. Furthermore, the mobile truck tent provides shade for individuals while camping.

Figure 1:
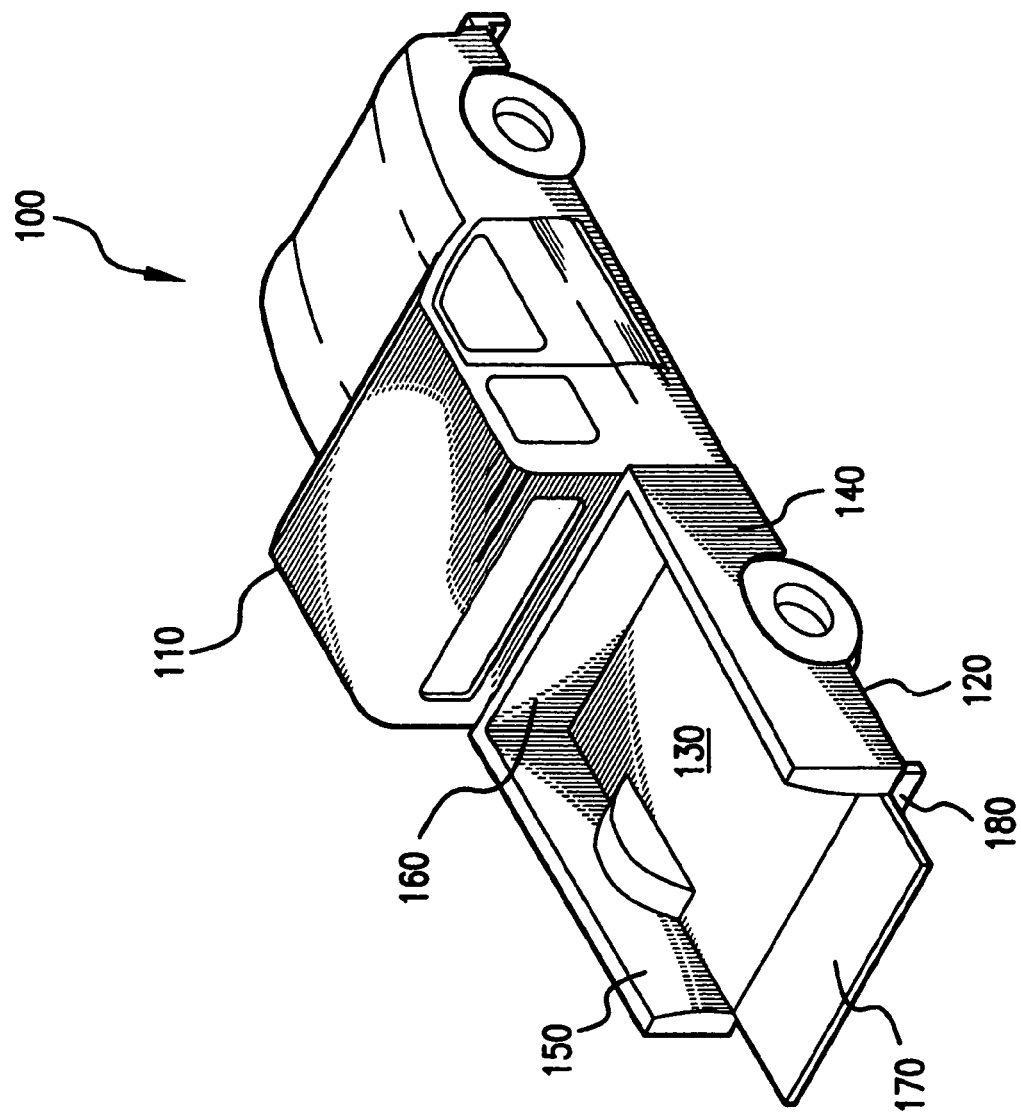
FIG. 1 is a perspective view of a pickup truck.

As shown in FIG. 1, a pickup truck 100 typically includes a cab 110 and a cargo box 120. The cargo box 120 includes a cargo box floor 130 having a left vertical sidewall 140, a right vertical sidewall 150, and a forward wall 160 extending perpendicularly between the sidewalls 140 and 150 to form a generally box shape. The sidewalls 140 and 150 are parallel to one another. FIG. 1 further shows a cargo box tailgate 170 that is movable between a closed position, wherein the tailgate 170 is upright over the cargo box floor 130 and the end of the cargo box 120 is closed, and an open position, wherein the tailgate 170 is lowered and the end of the cargo box 120 is open. Beneath the tailgate 170 is a bumper 180.

Figure 2A:
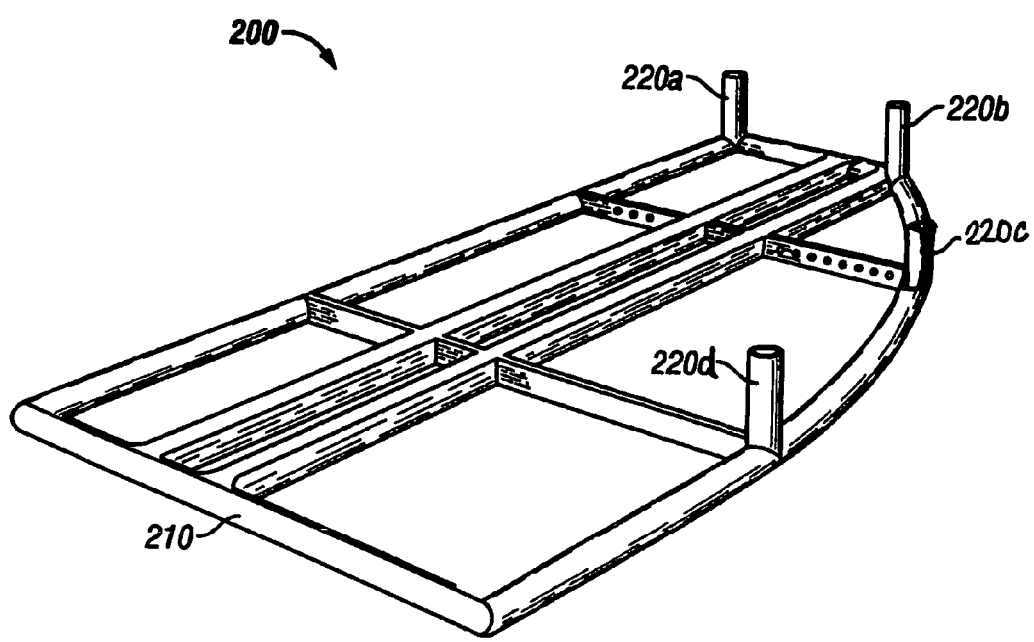
FIG. 2a is a front seat frame assembly of a mobile truck tent for installation on a pickup truck, according to an embodiment of the present invention.
Figure 3:
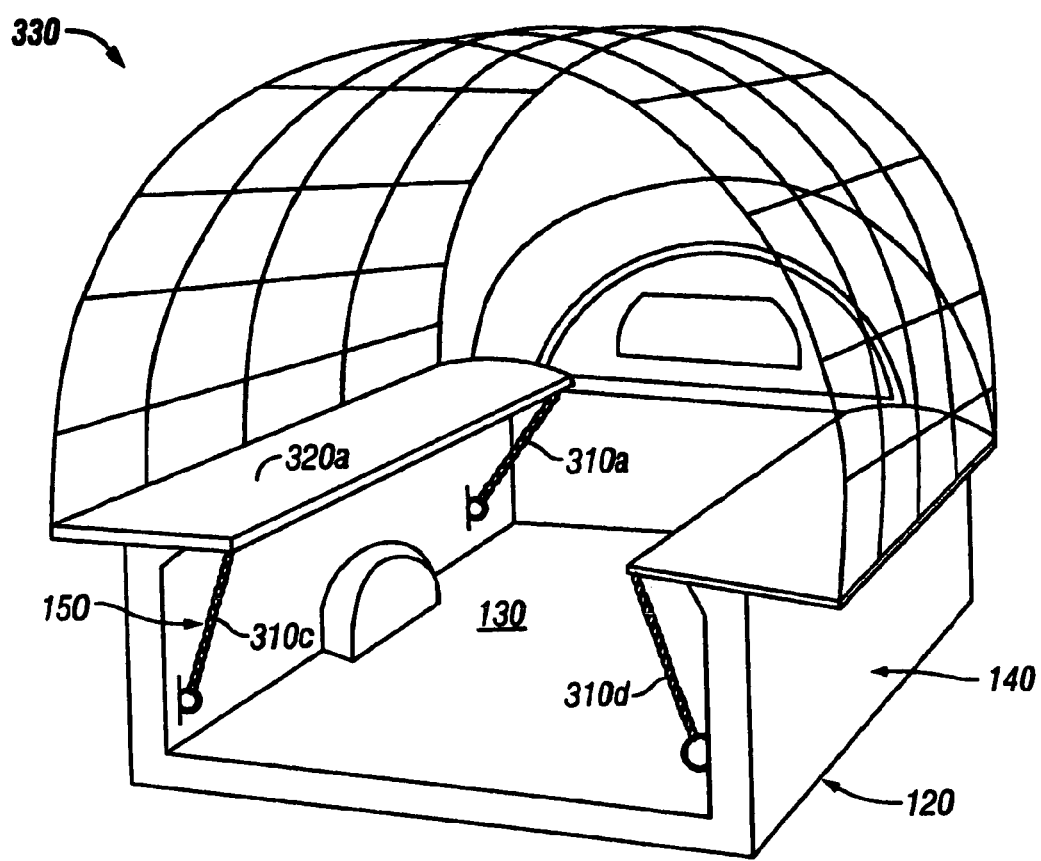
FIG. 3 is a perspective view of a steel frame assembly of a mobile truck tent installed on a pickup truck, according to an embodiment of the present invention.

Turning to FIG. 2a in conjunction with FIG. 3, a front seat frame assembly 200 of a mobile truck tent for installation to the cargo box 120 of the pickup truck 100 is shown. The front seat assembly 200 is made of round metal tubing 210. Steel is the preferred metal, but other metals such as aluminum, for example, may also be used. The metal tubing 210 has a one-inch dimension. The front seat frame assembly 200 has poles 220a, 220b, 220c and 220d that lock on truck tie downs in the cargo box 120. The primary tie downs are preferably clamps 310a and 310b (not shown) that hook under the lips of the cargo box 120. These secure tie downs allow for driving the pickup truck 100 safely at highway speeds with the mobile truck tent affixed thereto.

Figure 2B:
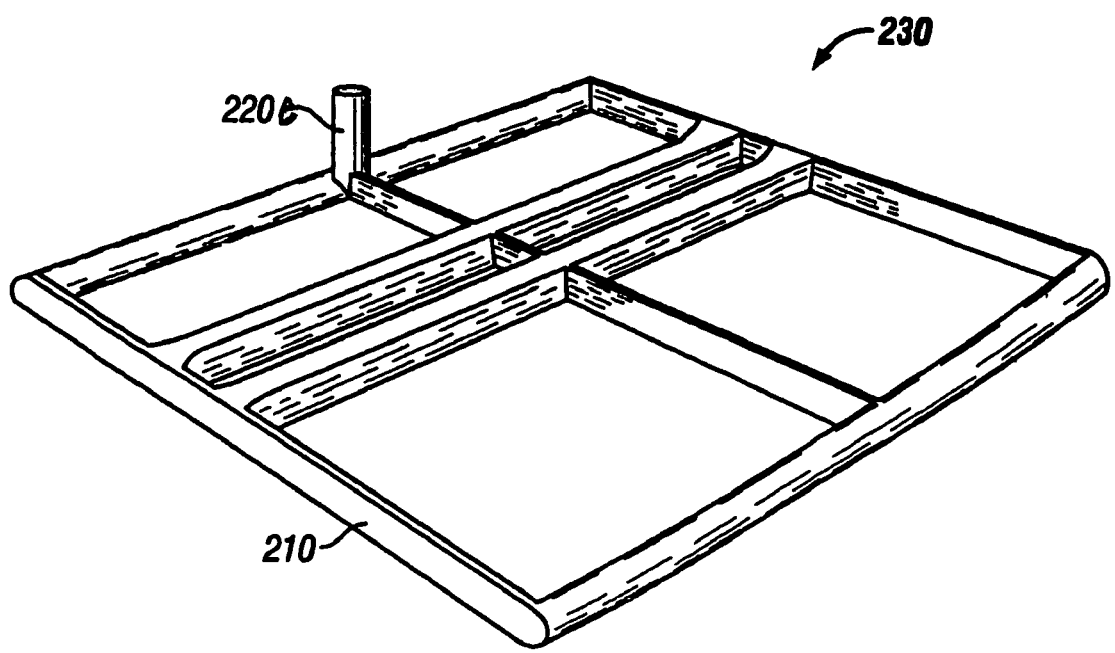
FIG. 2b is a center seat frame assembly of a mobile truck tent for installation on a pickup truck, according to an embodiment of the present invention.

FIG. 2b similarly shows a center seat frame assembly 230 of a mobile truck tent for installation on the pickup truck 100. The center seat assembly 230 is also made of round metal tubing 210, having a one-inch dimension. The center seat frame assembly 230 has a pole 220e that locks on truck tie downs in the cargo box 120.

Figure 2C:
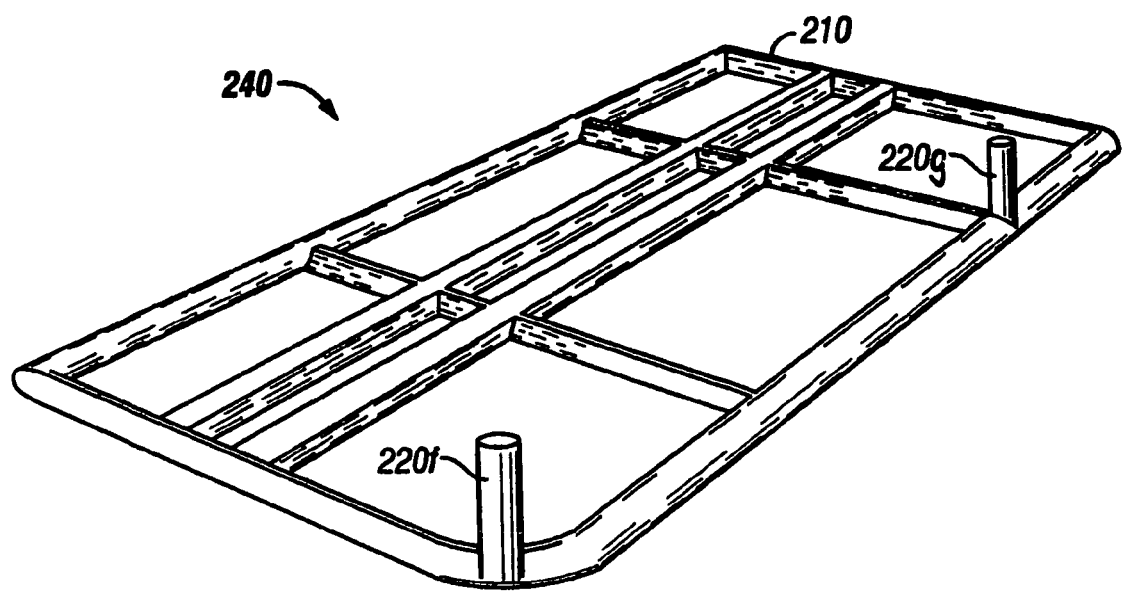
FIG. 2c is a rear seat frame assembly of a mobile truck tent for installation on a pickup truck, according to an embodiment of the present invention.

FIG. 2c shows a rear seat frame assembly 240 of a mobile truck tent for installation on the pickup truck 100. The rear seat assembly 240 is also made of round metal tubing 210, having a one-inch dimension. The rear seat frame assembly 240 has poles 220f and 220g that lock on truck tie downs in the cargo box 120. The primary tie downs are preferably turnbuckles 310c and 310d that hook under the lips of the cargo box 120. Again, these secure tie downs allow for driving the pickup truck 100 safely at highway speeds with the mobile truck tent affixed thereto. The front seat frame assembly 200, center seat frame assembly 230, and rear seat frame assembly 240 fit together to form a complete seat frame assembly.

As shown in FIG. 3, the mobile truck tent has bench seats 320a and 320b that sit on each side of the cargo box 120. Bench seats 320a and 320b are made of one-inch metal tubing. Steel is the preferred metal, but other metals such as aluminum, by way of example, may also be used. The clamps that secure the bench seats 320a and 320b are preferably threaded one-half inch tumbuckles 310c and 310d. These tumbuckles 310c and 310d prevent any axis of rotation from occurring while driving at highway speeds. Moreover, various nuts, bolts, and washers in the frame of the bench seats 320a and 320b allow for enlargement of bench seats 320a and 320b to fit long bed pickup trucks. In addition, a rubber gasket glues underneath the frames of the bench seats 320a and 320b for paint protection for the pickup truck 100. The bench seats 320a and 320b are six feet long and twenty inches wide and have numerous uses. For example, bench seats 320a and 320b can serve as beds for average-sized children. Bench seats 320a and 320b may further be used as nightstands for eyeglasses, alarm clocks, and various accoutrements. Camping gear and attire may be held on bench seats 320a and 320b. Indeed, bench seats 320a and 320b allow for many different storage applications. Velcro netting may also be added for storage space around bench seats 320a and 320b. For comfort, bench seats 320a and 320b have plastic seat covers that easily pop on top of the underlying metal tubing.

FIG. 3 further shows a shell assembly 330 for the mobile truck tent. The shell 330 is made of one-inch metal pipes/tubing, thereby providing the truck tent with the sheer strength necessary to withstand wind pressures encountered while driving in normal highway conditions. The various pipes, preferably made of steel, of the shell 330 may be used for storage purposes by hanging articles, such as, for example, clothing, from them. It is important to note that shell 330 assembles by way of sliding the various one-inch metal tubing pieces into one another with accommodating sleeves and buttons. Tie down clamps 310a and 310b and turnbuckles 310c and 310d allow for simple attachment and removal to the cargo box 120 of the pickup truck 100.

Figure 4:
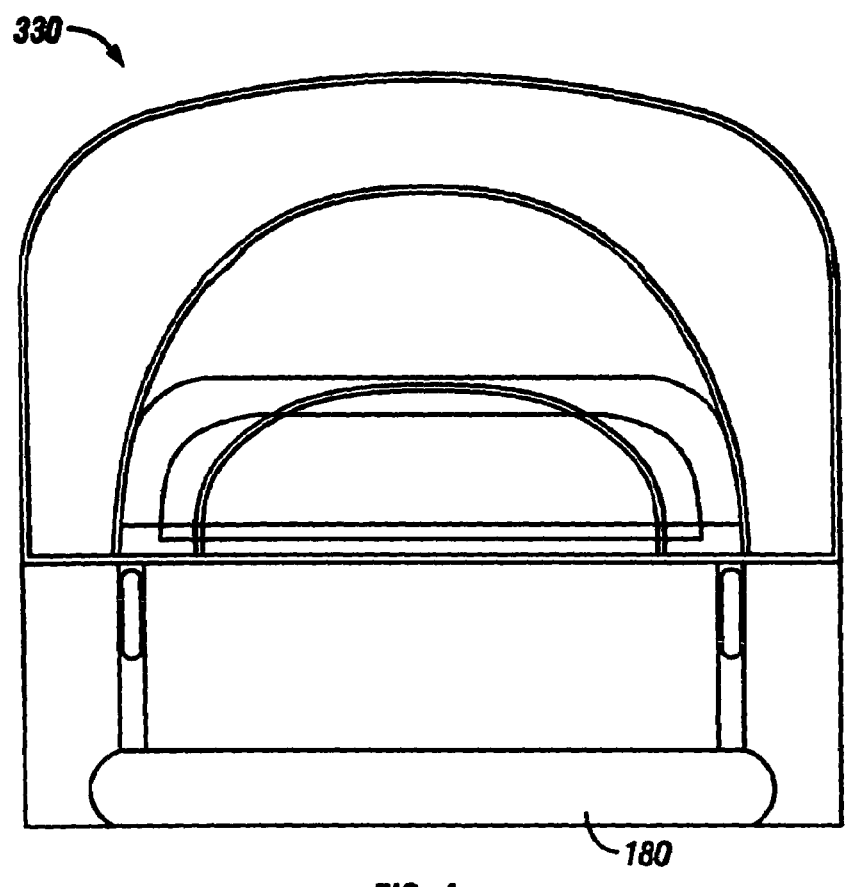
FIG. 4 is a back view of a steel frame assembly of a mobile truck tent installed on a pickup truck, according to an embodiment of the present invention.
Figure 5:
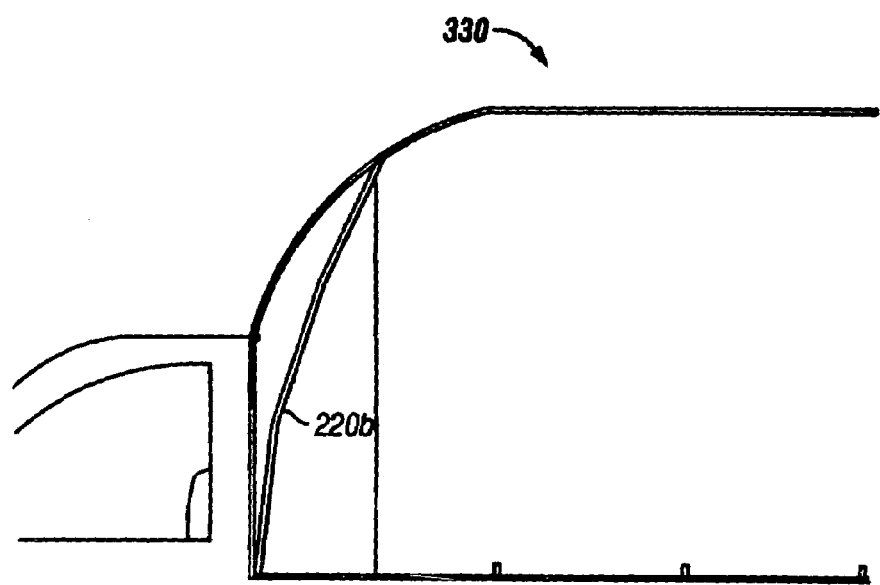
FIG. 5 is a side view of a steel frame assembly of a mobile truck tent installed on a pickup truck, according to an embodiment of the present invention.

FIG. 4 shows the back view of the shell assembly 330 of the mobile truck tent from as perched on the pickup truck 100. The bumper 180 of the pickup truck is clearly shown in this view. In addition, FIG. 5 shows a side view of a steel frame shell assembly 330 of the mobile truck tent. As shown from this perspective, the shell assembly 330 has an aerodynamic nose, thereby allowing for little wind resistance, even when driving at highway speeds.

Figure 6:
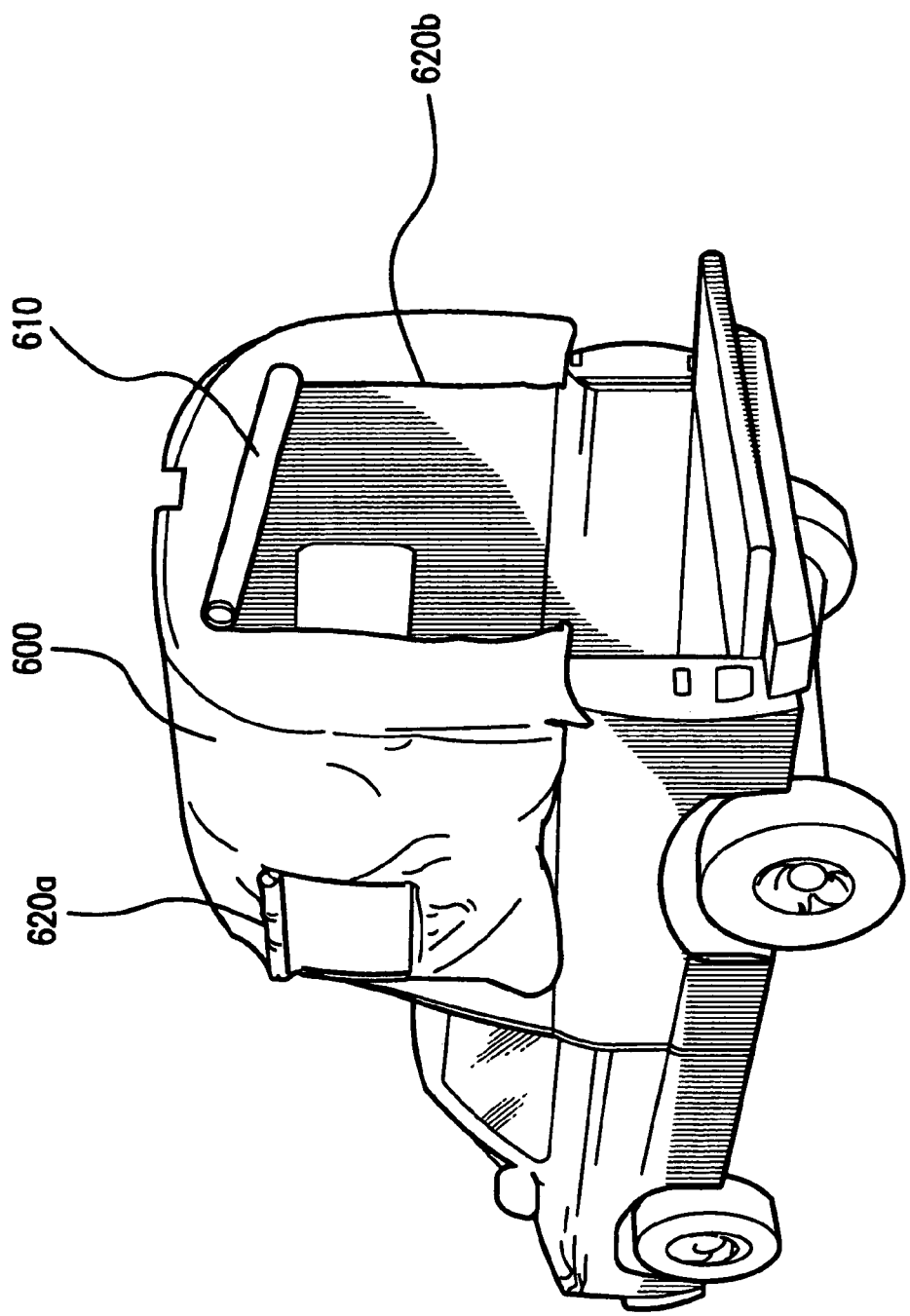
FIG. 6 is a depiction of an assembled mobile truck tent with its attached cover installed on a pickup truck, according to an embodiment of the present invention.
Figure 7:
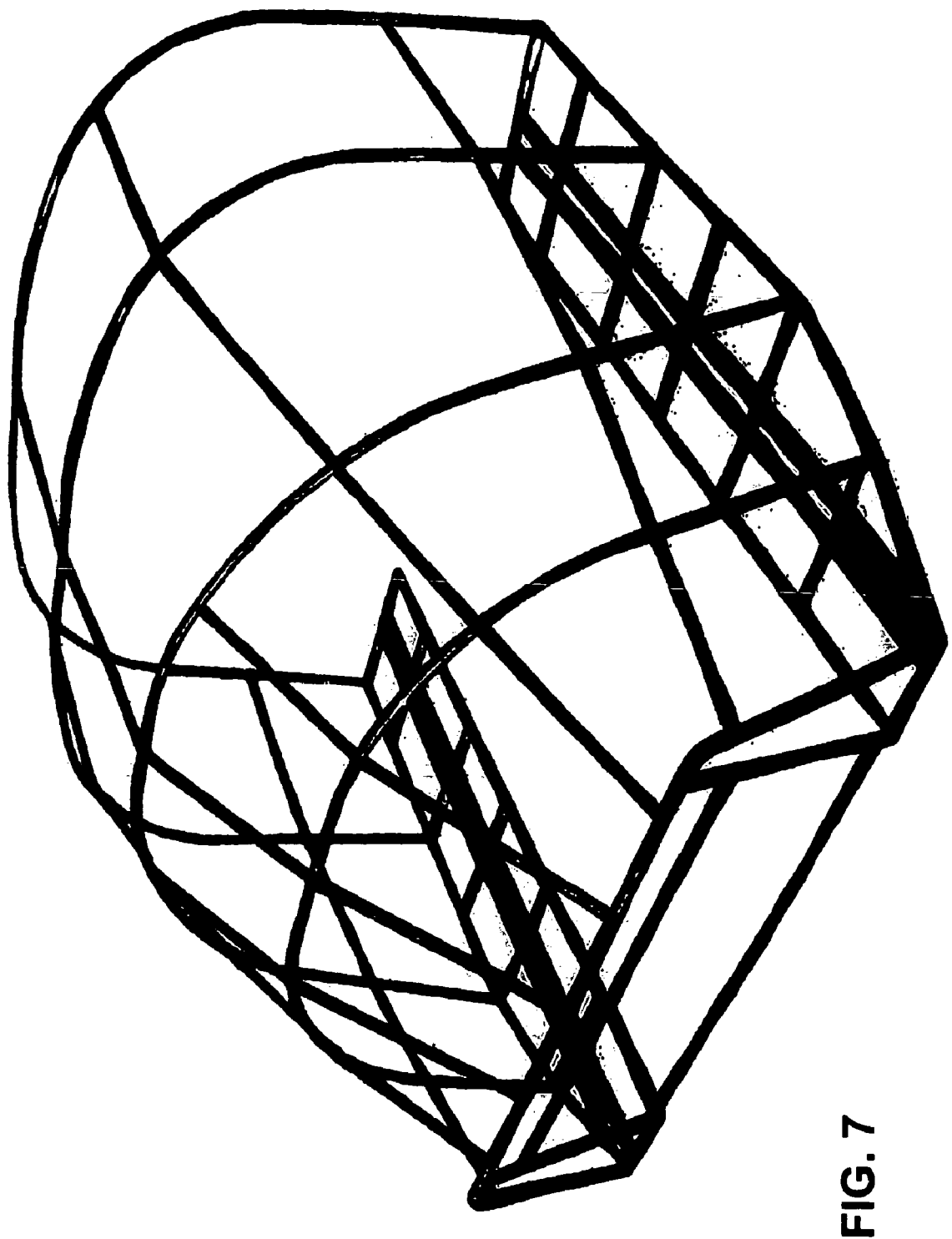
FIG. 7 is a view of the front seat frame assembly, center seat frame assembly, and rear seat frame assembly fit together to form a full seat frame assembly.

FIG. 6 shows a heavy fabric cover member 600 for the shell 330 of the truck tent. The cover is durable and waterproof. The cover member 600 may be of the Sunbrella variety as manufactured by Glen Raven Mills of Van Nuys, Calif. Other materials may be used for the cover member 600, such as the widely known and popular Gortex, for example. Preferably, the cover member 600 is treated on both the inside and outside for protection from the elements the cover member 600 is lightweight, thereby allowing for optimal fuel efficiency. The cover member 600 further includes a door 610 and windows 620a and 620b. Door 610 and windows 620a and 620b may be unzipped and un-velcroed for providing light and securing air flow. The cover member 600 may also be unzipped and serve as an awning for shading on hot camping days.

Figure 8:
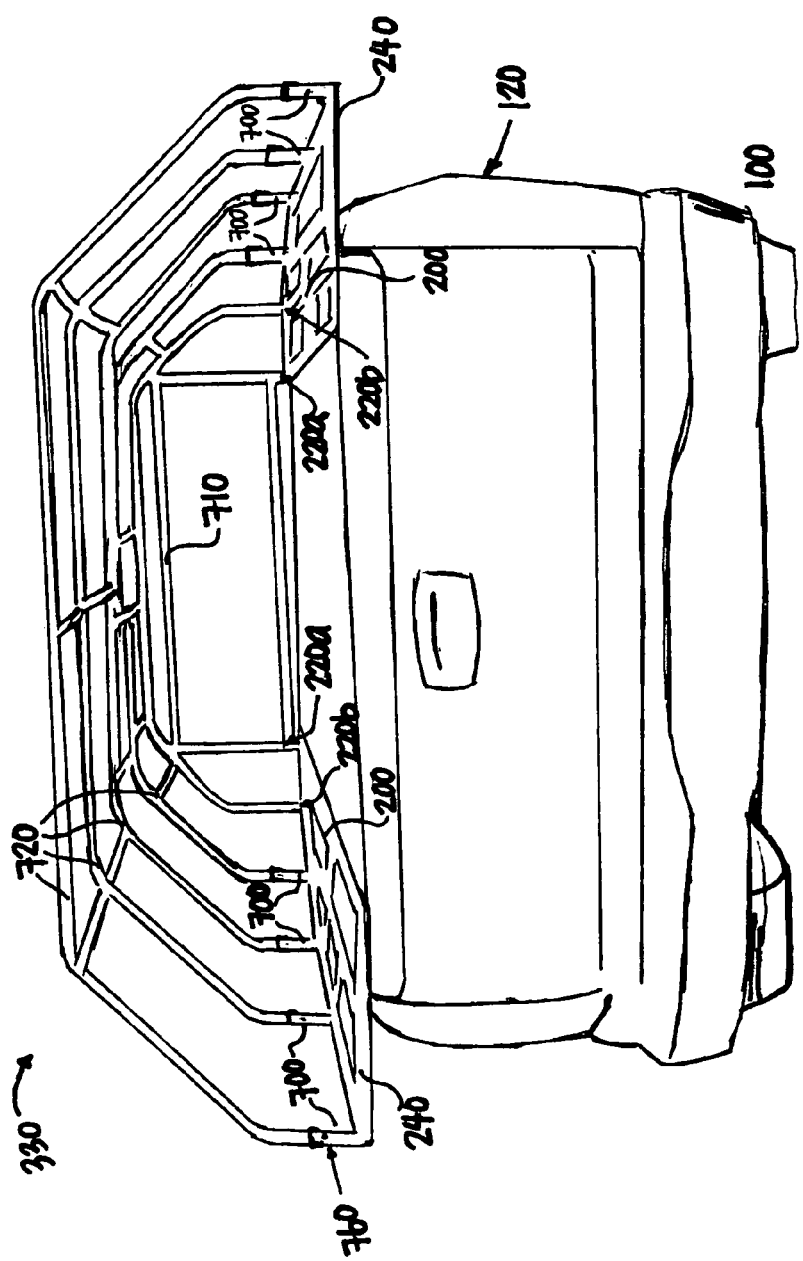
FIG. 8 is a back view of an alternative embodiment of the shell assembly of a mobile truck tent installed on a pickup truck, particularly in its lowered configuration.
Figure 9:
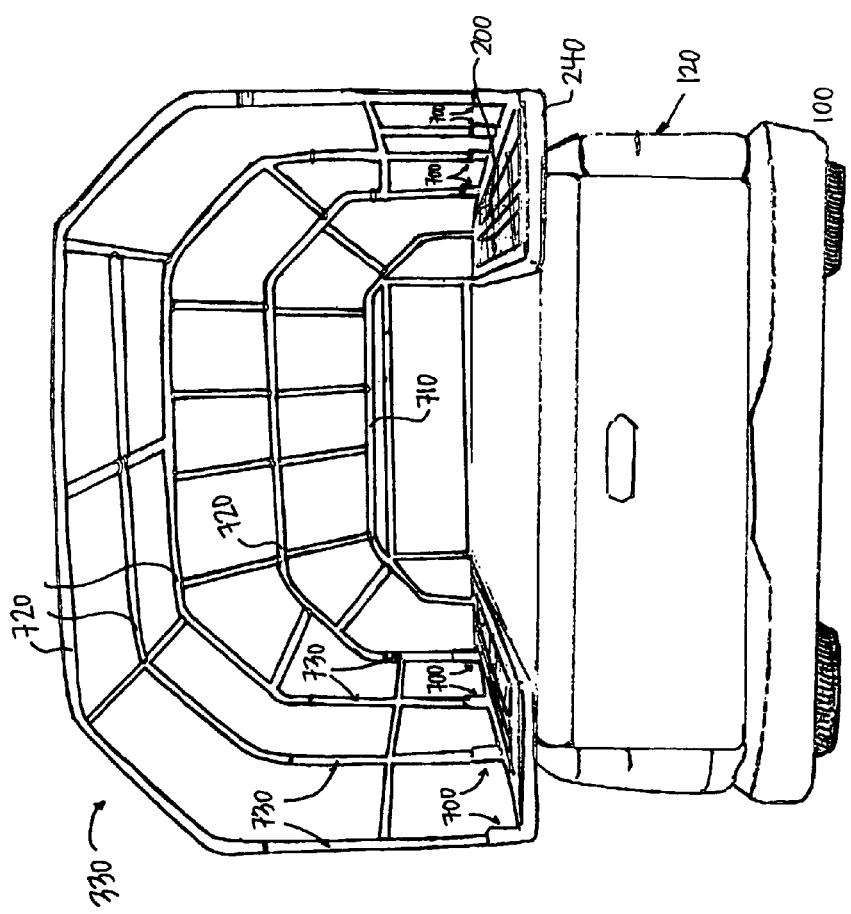
FIG. 9 is a back view of an alternative embodiment of the shell assembly of a mobile truck tent installed on a pickup truck, particularly in its raised configuration.

FIGS. 8 and 9 illustrate alternative embodiments for the mobile truck tent in which the shell assembly can be assembled in two different configurations such that the vertical height of the shell assembly 330 can be increased or decreased. FIG. 8 shows a back view of shell assembly 330 of the mobile truck tent installed on pickup truck 100 in its lowered configuration. In its lowered configuration, the vertical height of a center side of the tent and a rear side of the tent is no higher than a front side of the tent. The shell 330 is made of rigid metal pipes/tubing that can range in diameter from seven-eighths of an inch to one and one-eighths inches. The metal pipes/tubing of shell 330 can be made out of aluminum; however, shell 330 can be made out of steel, titanium, brass or any other rigid material that is capable of providing the truck tent with the sheer strength necessary to withstand wind pressures encountered while driving in normal highway conditions.

Figure 11:
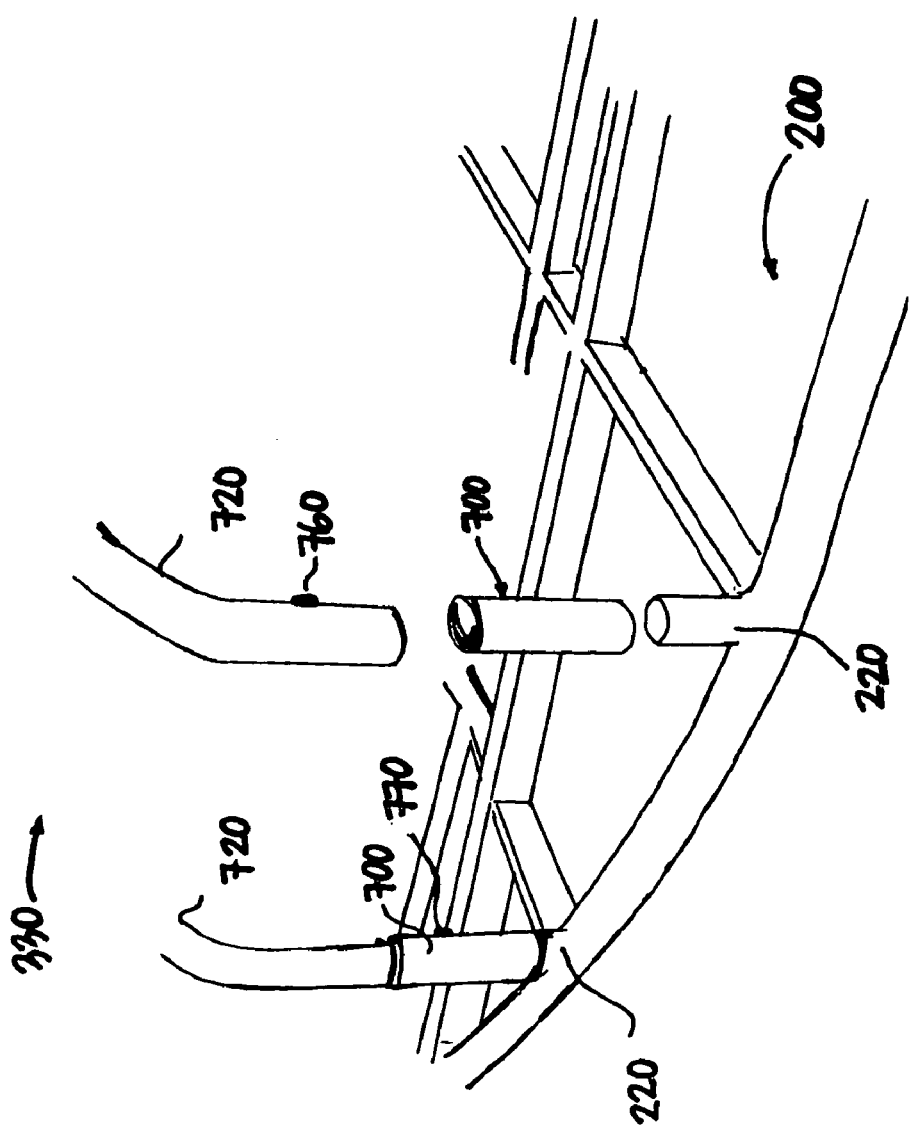
FIG. 11 is a view of a frame sleeve member for attaching the shell assembly to the seat frame assembly of a mobile truck tent for installation on a pickup truck, according to an embodiment of the present invention.

Referring to FIGS. 8 and 11, the front seat frame assembly 200 and rear seat assembly 240 fit together to form a seat frame assembly. The center seat frame assembly 230 (not shown) can be added to lengthen the seat frame assembly to fit longer bed pickup trucks. A first frame member 710 of shell assembly 330 is placed at the front end of the cargo box 120 and extends perpendicularly between the sidewalls of the cargo box 120. The first frame member 710 of shell assembly 330 is constructed of round metal tubing and removably attaches to poles 220a and 220b of the front seat frame assembly 200 on both sides of the cargo box 120. The shell assembly also comprises a plurality of secondary frame members 720 that is made of round metal tubing. Each secondary frame member 720 is orientated such that it is parallel to one another from the front end to the rear end of the shell assembly 330. The secondary frame members 720 are coupled to one another above the cargo box 120 by way of sliding various round metal tubing pieces of various lengths into one another with accommodating sleeves and buttons. The plurality of secondary frame members 720 is connected to the seat frame assembly by way of a plurality of frame sleeve members 700. The bottommost end on each secondary frame member 720 comprises a button 760 in which frame sleeve member 700 has an aperture 770 where button 760 can pass. The frame sleeve member 700 engages button 760 and slides onto pole receptacle 220 to attach secondary frame member 720 to the seat frame assembly.

FIG. 9 depicts the shell assembly 330 of the mobile truck tent installed on the pickup truck 100 in its raised configuration. To achieve this raised configuration, secondary frame member 720 is disconnected from the seat frame assembly by releasing the frame sleeve button 760 and sliding the frame sleeve member 700 off the pole receptacle 220. A plurality of extension means 730 made of one-inch round metal tubing are interposed between the pole receptacle 220 and the secondary frame member 720. Extension means 730 attach to the seat frame assembly by way of the frame sleeve member 760 in order to raise the vertical height of the shell assembly 330.

Figure 10:
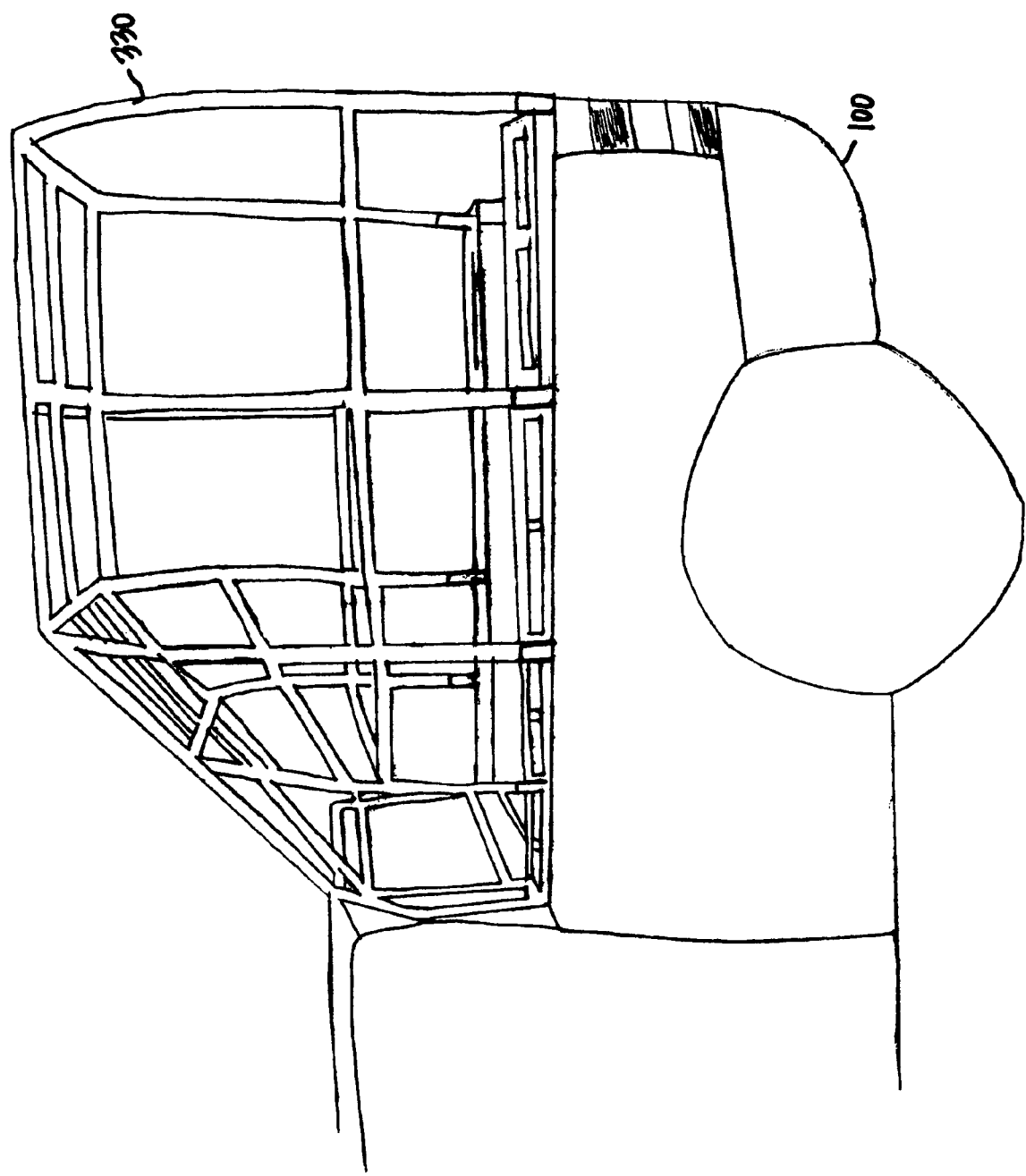
FIG. 10 is a side view of an alternative embodiment of the shell assembly of a mobile truck tent installed on a pickup truck, particularly in its raised configuration.

The side view of the shell assembly 330 of the mobile truck tent installed on the pickup truck 100 in FIG. 10 shows the raised configuration of the shell assembly 330. As shown from this perspective, shell assembly 330 has an aerodynamic nose and the vertical height is raised such that the vertical height of the front side of the tent is lower than the vertical height of the center and rear sides.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A mobile truck tent assembly, comprising:
   a tent;
   a seat frame assembly;
   a plurality of poles affixed to the seat frame assembly for receiving metal tubing;
   a shell assembly made of rigid metal tubing that is selectively received by the plurality of poles, and which supports the tent in a generally suspended configuration;
   the shell assembly having an aerodynamic nose whose slope can be adjusted generally upward from a first side of the tent;
   means for securing the shell assembly and the seat frame assembly to the truck, wherein the securing means in combination with the rigid shell assembly enable the truck tent assembly to be stabile and securely attached to the truck under a variety of driving conditions.

2. The portable truck tent assembly of claim 1, wherein the shell assembly has a lowered configuration such that the vertical height of the first side of the tent is no higher than the vertical height of a second side of the tent.

3. The portable truck tent assembly of claim 1, wherein the shell assembly has a raised configuration such that the vertical height of the first side of the tent is lower than the vertical height of the second side of the tent.

4. The portable truck tent assembly of claim 3, wherein a plurality of extension members attach to a plurality of sleeve members, each sleeve member dimensioned to receive the pole affixed to the seat frame assembly to allow for the raised configuration of the shell assembly.

5. The portable truck tent assembly of claim 1, wherein the shell assembly includes a plurality of frame members that releasably connect to the plurality of poles affixed to the seat assembly.

6. The portable truck tent assembly of claim 1, wherein the tent has a lightweight, durable, waterproof cover with at least one window and one door.

7. The portable truck tent assembly of claim 1, wherein the plurality of clamps, threaded bolts, and turnbuckles allow for efficient attachment and removal of the mobile truck tent to and from the cargo box of the pickup truck.

8. A portable truck tent assembly, comprising:
   a tent having a front side adjacent to a cab of the truck, a center side, and a rear side adjacent to the rear of the truck;
   a front seat frame assembly located within and at the front side of the tent, made of round metal tubing having at least one pole that receives metal tubing;
   a rear seat frame assembly located within and at the front side of the tent, made of round metal tubing having at least one pole that receives metal tubing;
   a center seat frame assembly located within and between the front and rear sides of the tent, made of round metal tubing having at least one pole that receives metal tubing;
   an arcuate shell assembly comprised of rigid metal tubing that is selectively received by the at least one pole of the front seat frame assembly, the center seat frame assembly, and the rear seat assembly, and which supports the tent in a generally suspended configuration;
   the shell assembly having an adjustable vertical height of the center and rear sides of the tent;
   tie down means for securing the shell assembly and the seat frame assembly to the truck, wherein the tie down means in combination with the rigid shell assembly enable the truck tent to be stabile and securely attached to the truck under a variety of driving conditions; and
   a plurality of bench seats joined to the front, center, and rear seat frame assemblies.

9. The portable truck tent assembly of claim 8, wherein the front seat frame assembly, center seat frame assembly, and rear seat frame assembly fit together to form a full seat frame assembly.

10. The portable truck tent assembly of claim 8, wherein the plurality of bench seats have a plastic cover member.

11. The portable truck tent assembly of claim 10, wherein the plurality of bench seats serve as storage devices.

12. The portable truck tent assembly of claim 8, wherein the shell assembly serves as a storage apparatus.

13. The portable truck tent assembly of claim 8, wherein the cover member is waterproof, durable, and lightweight for fuel efficiency.

14. The portable truck tent assembly of claim 8, wherein the tie down means are at least one of clamps or turnbuckles that hook under at least one lip of a cargo box of a pickup truck.

* * * * *